United States Patent [19]

Hollister et al.

[11] Patent Number: 4,515,174
[45] Date of Patent: May 7, 1985

[54] GATE VALVE WITH INTERNAL PRESSURE RELIEF MEANS

[75] Inventors: F. Harold Hollister, Houston; Danny S. Meyer, Richmond, both of Tex.

[73] Assignee: Joy Manufacturing Company, Pittsburgh, Pa.

[21] Appl. No.: 565,550

[22] Filed: Dec. 27, 1983

[51] Int. Cl.³ ............................................. F16K 13/04
[52] U.S. Cl. ....................................... 137/72; 137/74; 251/167; 251/196
[58] Field of Search .................. 137/72, 74; 251/167, 251/196

[56] References Cited

U.S. PATENT DOCUMENTS

| | | | |
|---|---|---|---|
| 2,171,588 | 9/1939 | McGuffey | 137/74 X |
| 2,670,752 | 3/1954 | Laurent | 137/119 |
| 4,232,796 | 11/1980 | Hudson | 137/72 X |

FOREIGN PATENT DOCUMENTS 8301100  3/1983  PCT Int'l Appl. ............... 137/72

Primary Examiner—Harold W. Weakley
Attorney, Agent, or Firm—Marvin J. Marnock

[57] ABSTRACT

A valve (10) having an expansible gate assemblage of ported juxtaposed gate and segment members (18, 19) which are movable into sealing engagement with upstream and downstream valve seats (28) about the flow passage (12, 14) in the open and closed conditions of the valve wherein the valve includes pressure relief means which relieves excessive pressure in the valve chamber (11) into the upstream flow passage (12) when the environment in the chamber reaches a preselected temperature with the valve retaining capability of providing an upstream seal in the event of subsequent downstream leakage. The pressure relief means is installed in the segment member (19) of the gate assembly and comprises a passage (43) extending from the port (16) through the segment to the sealing face (25) of the segment member at a location which is exposed to the upstream flow passage (12) in the valve closed condition. The passage (43) includes an enlarged diameter section (44) which is normally plugged by a ball check valve element (42) seated against a shoulder (46) formed in the passage (43) and held thereagainst by a plug (41) of eutectic material and a retainer (47) with an aperture (48) therethrough. The eutectic material is selected to melt at a preselected temperature whereby a pressure build-up in the valve chamber is relieved by unseating the ball check (42) and forcing the molten eutectic material (41) through the apertured retainer (47) into the upstream flow passage (12). In the event of subsequent leakage of the downstream seal to from elsewhere in the valve chamber (11) the upstream line pressure causes the ball check (42) to seat and block the passage (43) such that the valve will again provide an upstream seal.

6 Claims, 4 Drawing Figures

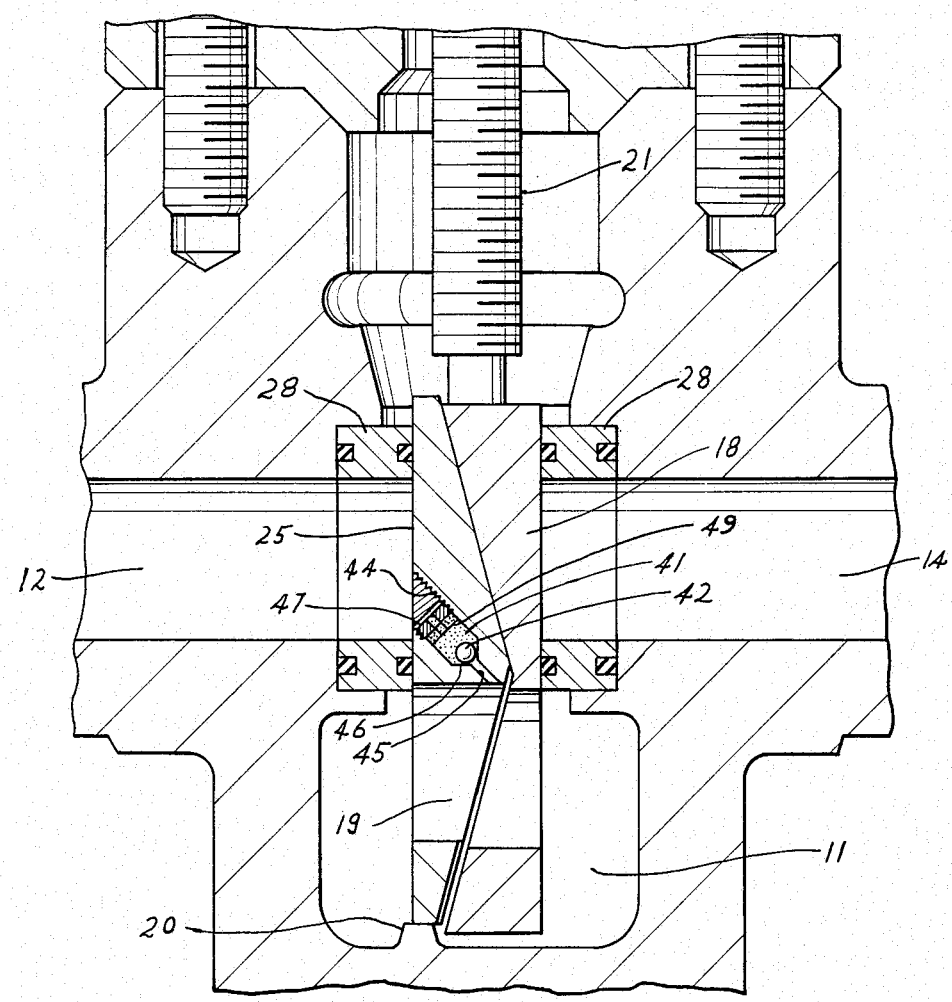
FIG. 2
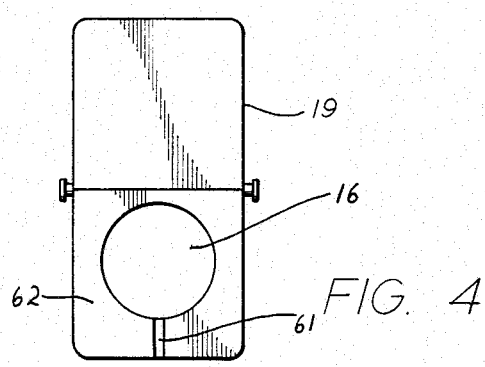
FIG. 4
FIG. 3

GATE VALVE WITH INTERNAL PRESSURE RELIEF MEANS

BACKGROUND OF THE INVENTION

The invention relates to a "fire-safe" valve which avoids dangerous pressure build-up in the valve chamber by establishing communication between the valve chamber and the flow passage through the valve when the environment in the valve chamber reaches a preselected temperature. More specifically, the invention relates to a valve of the type having an expansible gate assembly wherein the gate assembly is provided with means for providing communication between the valve chamber and the upstream flow passage in the event the environment within the valve chamber reaches a preselected temperature condition and the valve retains the capability of providing an upstream seal in the event of subsequent leakage from the valve chamber.

It is a recognized problem that sometimes when a gate valve is exposed to a fire condition wherein the valve chamber is sealed off in the closed or open condition of the valve, the resulting high temperatures can create abnormally high pressures in the valve chamber which results in the destruction of the valve as by shearing of the bonnet bolts or fracture of the valve body. There have been attempts to deal with this problem. For example, in U.S. Pat. No. 2,670,752, there is disclosed a gate valve having check valves mounted in the gate assembly for relieving excessive pressure in the valve housing. This device utilizes spring-biased ball checks which must seat and seal during normal operation of the gate valve. Leakage past the ball checks sometimes occurs due to particle contamination of the effluent which hinders the function of the springs or the check valve seats. In U.S. Pat. No. 4,393,889 there is disclosed a "fire-safe" gate valve structure which utilizes a relief plug installed in a port in one of the valve seat rings and exposed to the environment of the valve chamber. The relief plug is adapted to evacuate the port into the upstream flow passage upon the fluid environment in the valve chamber reaching a preselected pressure condition or when a preselected pressure differential exists between the valve chamber and flow passage. However, once the plug has been expelled there is no upstream seal for the valve. Also, in applications where it is required that the valve seat rings be interchangeable and this type of seat ring with relief plug is employed for both the upstream and downstream sides of the gate assembly, once the preselected temperature is reached, the valve is never again able to close the flowline through the valve.

It is therefore, an object of the invention to provide an improved valve structure which enables the valve in operation to withstand abnormally high temperature situations by allowing pressure within the valve chamber to be relieved by establishing communication between the valve chamber and the upstream flow passage when the environment in the chamber reaches a preselected temperature and after the valve chamber has been relieved, is still capable of providing an upstream seal if there is a failure of the downstream seal or leakage from the valve chamber.

SUMMARY OF THE INVENTION

The invention is an improved valve structure of the type having an expansible gate assemblage of ported juxtaposed gate and segment members which are movable into sealing engagement with upstream and downstream valve seats about the flow passage in the open and closed conditions of the valve. The valve includes pressure relief means which allows excessive pressure within the valve chamber to be relieved by establishing communication between the valve chamber and the upstream flow passage when the environment in the chamber reaches a preselected temperature and is still capable of providing an upstream seal in the event of subsequent downstream leakage. The pressure relief means is installed in the upstream segment member of the gate assembly and comprises a passage extending from the port through the segment to the sealing face of the segment member at a location which is exposed to the upstream flow passage in the valve closed condition. The passage includes an enlarged diameter counterbore section which is normally plugged by a ball check valve element seated against a seating shoulder formed in the passage and held thereagainst by a plug of eutectic material and a retainer with an aperture therethrough. The eutectic material is selected to melt or degrade at a preselected temperature whereby a pressure build-up in the valve chamber is relieved by unseating the ball check element and forcing the eutectic material through the apertured retainer into the upstream flow passage. In the event of a subsequent leakage past the downstream seal or from elsewhere in the valve chamber the upstream line pressure will cause the ball check to seat and block the passage such that the valve will again provide an upstream seal.

BRIEF DESCRIPTION OF THE DRAWINGS

FIG. 2 is an enlarged sectional view of the gate assembly of the valve when in the valve closed position and showing details of the pressure relief means;

FIG. 3 is a further enlarged view showing one end of the retainer plug member of the pressure relief means of the invention; and FIG. 4 is an enlarged plan view of the segment member of the gate assembly of the valve of FIG. 1.

DESCRIPTION OF A PREFERRED EMBODIMENT

Figure 1:
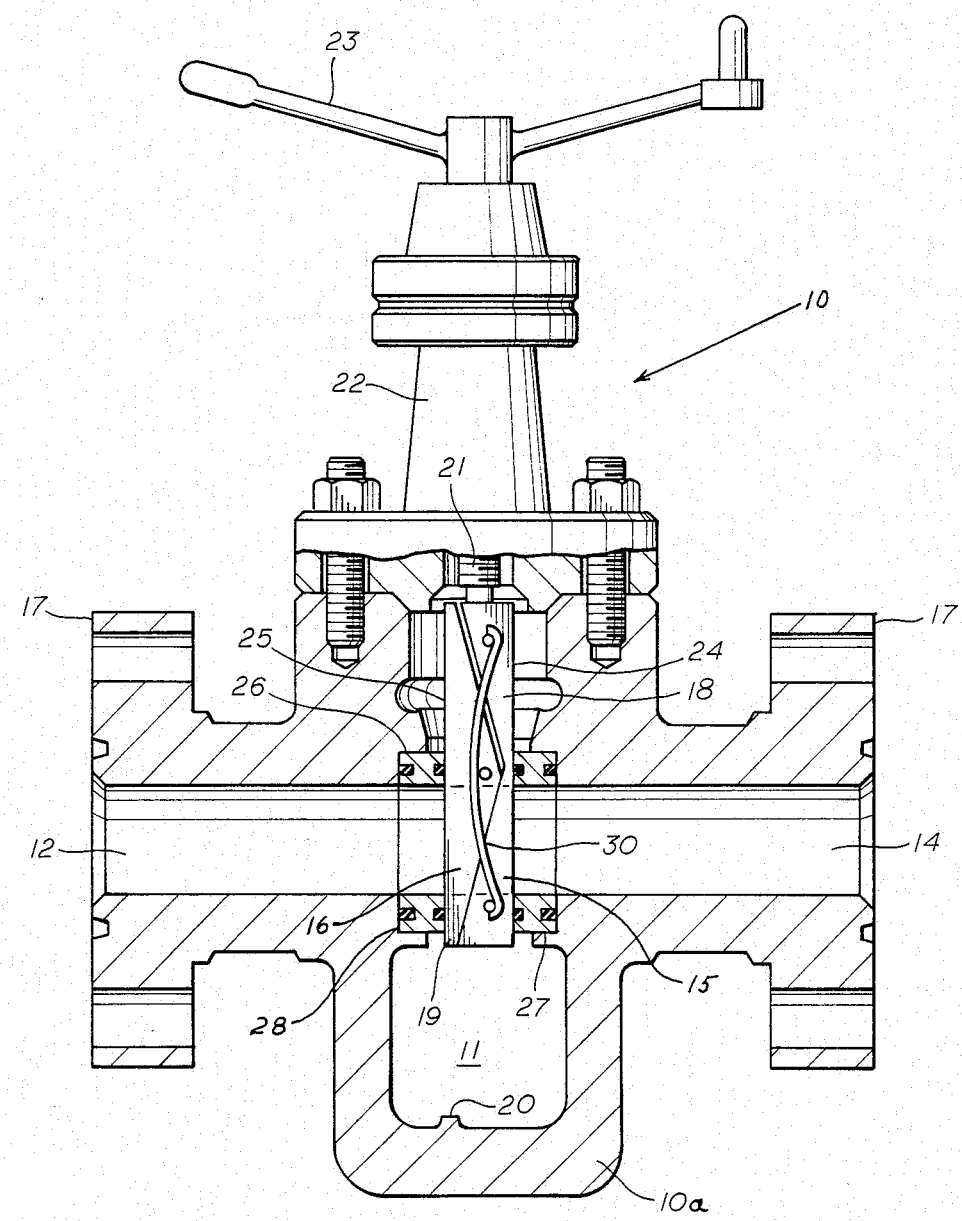
FIG. 1 is a plan view, a portion shown in section, of a non-rising stem type expanding gate valve which embodies the invention wherein a pressure relief means is provided in the segment member of the gate assembly of the valve which is shown in the open condition.

Referring to the drawings in greater detail, the invention is illustrated herein in connection with a gate valve of conventional type which utilizes the principle of parallel expanding gates for obtaining a positive, mechanical seal on both the upstream and downstream sides of the gates. FIG. 1 shows such a gate valve which employs the unique gate assembly of this invention. The valve 10 shown in FIG. 1 includes a valve body 10a provided with a valve chamber 11 and inlet and outlet flow passages 12 and 14 which are adapted to be in fluid communication with the valve chamber 11 to form a flow way through the valve. Flanges 17 are formed at the ends of the valve body to provide means for connecting the valve to a flowline in a conventional manner.

Within the valve chamber 11, a gate assembly of conventional design is mounted for sliding movement transversely of the flow passages to open or close the flow way. The gate assembly comprises a gate member 18 and a segment 19. The gate 18 is connected at its upper end to a valve stem 21 carried in the valve bonnet 22 which is bolted atop the valve body 10a and closes the upper end of the valve chamber 11. The stem 21 extends through the bonnet and at its upper end is provided with a valve actuating member such as a handwheel 23. The stem 21 is connected to the gate member 18 so that upon rotation of the handwheel, the gate assembly is movable across the flow way to open or close the valve. In the open position, ports 15, 16 in the gate and segment are aligned in registry with the inlet and outlet passages 12 and 14. As is conventional, the gate member 18 is provided with a V-shaped recess which accommodates the wedge shaped segment 19, the wedge faces of which conform to the surfaces of the V-shaped recess and are in sliding contact therewith. As is well known to those skilled in the art, the linear movement of the gate assembly to open or close the valve, causes an expansion of the gate assembly in the open and closed positions due to relative sliding movement between the gate member 18 and segment member 19, the sliding movement being induced by the suitable stop means, such as the stop 20 in the valve chamber 11 which limits the vertical movement of the segment 19 relative to the gate 18.

At the inner ends of the flow passages 12 and 14, the valve body 10a is provided with annular recesses 26 and 27, respectively surrounding the flow way in concentric relation therewith and opening into the valve chamber 11. The annular recesses 26 and 27 form seat pockets in each of which a valve seat ring 28 is inserted.

For sealing, the gate 18 is provided with flat outwardly facing sealing surface 24 which is oriented substantially parallel at all times to a similar outward facing sealing surface 25 on the segment 19. When the gate assembly is expanded in the open and closed conditions of the valve, the surfaces 24 and 25 establish sealing relationships with the valve seats 28. When in transit between the open and closed positions, the gate assembly assumes a collapsed condition which is induced by a suitable conventional means, such as springs 30 affixed to the sides of the gate and segment for continuously urging them together to a "nested" relationship wherein the respective apexes of their inner wedge faces are aligned.

Should the valve of this invention be installed in a flowline and become exposed to abnormally high external temperatures, as in a "fire" condition, there is danger that heated fluid trapped in the valve chamber will become pressurized to an extent which can fracture the valve body or otherwise destroy the valve. To provide a means for relieving fluid pressure in the valve chamber when the gate assembly is expanded to sealingly engage the valve seat rings in the closed condition of the valve, a pressure relief means is provided in the segment member 19 of the gate assembly as shown in FIG. 2.

The pressure relief means comprises a plug 41 of eutectic material and a ball check 42 which are mounted in a passage 43 formed at an angle in the segmment 19 so as to open at one end at the sealing face 25 of the segment 19 and at the other end into the port through the segment. The passage 43 comprises a large diameter section 44 extending inwardly from the segment face 25 and a smaller diameter section 45 extending from the port. The large diameter section 44 is provided with internal threads through a portion thereof, with the threads being provided from the face of the segment 19.

A frusto-conical seating surface 46 is also provided in the passage 43 which joins the large diameter passage section 44 with the smaller diameter passage section 45. The ball check 42 is of hard metal material and in installed in the passage 43 to seat against the frusto-conical seat 46 and normally block the passage 43. The plug 41 of eutectic material is also deposited in the passage 43 against the ball 42. The eutectic plug 41 and the ball 42 are retained in the passage 43 by a hard metal retainer cap 47 which is threaded into the passage 43 from the segment face 25. The retainer cap 47 is formed with a central axial bore 48 extending therethrough and on its end face 49 which is disposed adjacent the ball 42 is provided with diametral grooves 51, 52 which intersect the passage 43, as best shown in FIG. 3. Preferably, the grooves are disposed perpendicularly to one another so that the retainer 47 may be easily threaded into the passage 43, the other end face of the retainer 47 is provided with similar grooves for accommodating a tool, such as a screw driver.

As previously mentioned, the pressure relief means installed in the segment 19 provides a measure of safety for valve operation. In the event the valve body reaches the high temperatures as are associated with a fire, the pressure build-up in the valve chamber can cause the destruction of the valve unless a pressure relief means such as herein disclosed is provided. When in operation in the valve closed condition, as shown in FIG. 2, the eutectic material in the passage 43 is designed to melt at a predetermined temperature. In this event, fluid pressure build-up in the valve chamber 11 will generally exceed the pressure in the flowline and the eutectic material will be forced from the passage 43 into the flowline on the upstream side of the valve to thereby establish fluid communication between the valve chamber 11 and the flow passage 12 and relieve the valve chamber from a dangerous condition.

It will therefore be seen that a pressure balance will be established between the valve chamber 11 and the flow passage 12 and only a downstream seal is provided by the valve. However, should a pressure differential be established in the reverse direction that is wherein the flowline passage comes to exceed the pressure in the valve chamber 11, the ball 42 is forced against the frusto-conical seat 46 in the passage 43 and acts as a check valve to block communication between the flowline passage 12 and the valve member 11 and thereby permit the valve to reestablish an upstream seal between the gate assembly and the valve seat ring on the upstream side. A failure of the downstream sealing mechanism or a valve stem packing leak, are but two reasons why such a pressure differential would be established to cause the ball 42 to seat and block the passage 43.

It is also to be appreciated that in the open condition of the valve, such as illustrated in FIG. 1, the gate assembly is also expanded into engagement with the valve seat rings 28 and fluid may be trapped in the valve chamber 11. In the event of a fire, a pressure build-up in the valve chamber might also occur in the valve open condition which could also possibly destroy the valve. To avoid this possibility, a groove 61 may be provided which extends in the wedge face 62 of the segment 19 from the port 16 to the edge of the segment. Preferably, the groove 61 should extend along or parallel to the longitudinal axis of the segment. The groove 61 insures that there is always fluid communication between the valve chamber 11 and the flow passage through the valve. While this removes the capability of many valves to seal in the open condition as might be desirable for a "block and bleed" operation wherein it would be possible to repair or replace the valve stem packing when the valve is in operation in the open condition, it is nevertheless suitable for valves which are provided with a stem "back seat" capability. With such valves, it is possible to raise the stem and provide a seal of the valve chamber by means of cooperative sealing surfaces on the valve stem and the valve body or valve bonnet.

Also, were it more desirable to provide for a pressure relief of the valve when in the open condition rather than the closed condition, this could be accomplished by reversing the orientation of the passage 43 in the segment 19 such that the large diameter section 44 of the passage opens into the segment port 16. In like fashion to the operation of the embodiment of FIG. 2, the passage 43 is evacuated into the upstream flow passage at a predetermined high temperature and the ball seats 42 in the direction of flow from the flow passage 12 to the valve chamber 11 in the event of a reverse pressure differential as may be induced by leakage from the valve chamber.

Obviously, the particular eutectic material which is chosen for the pressure relief means of this invention will depend largely on the specific temperature at which it is to degrade and yield. It is important, however, that the material is not of a type which would leave a residue. It should be selected so that degradation and evacuation of the plug will occur at a desired temperature of the valve chamber. One exemplary material is a eutectic material termed "Cerrocast" manufactured by Cerco Corporation, New York, N.Y., which according to the manufacturer's specifications includes an alloy of 4% bismuth, 55.5% lead, and 40.5% tin. This particular alloy melts in the range of 338° (170° C.) to 388° F. (198° C.) and yields at 343° F. (173° C.).

While the invention has been illustrated with respect to a non-rising stem gate valve, it is to be understood that it has equal applicability to rising stem gate valves. Also, while the foregoing description of the invention has been presented for purposes of illustration and explanation, it is not intended as limiting the invention to the precise form disclosed as changes in details of construction may be made by those skilled in the art, within the scope of the appended claims, without departing from the spirit of the invention. For example, the ball check element need not be a ball but could be such as a conical tipped element. In addition, the seating surfaces need not be of frusto-conical configuration.

What is claimed is:

1. In a gate valve having a valve body with inlet and outlet flow passages defining a flow way through said valve, a valve chamber in the body communicating with said flow passages, opposed aligned valve seats in said valve body surrounding the inlet and outlet flow passages and exposed to said valve chamber, an expansible ported gate assembly movably mounted in the valve chamber for rectilinear movement across said flow way between a first position wherein the valve is open and a second position wherein the valve is closed, said assemblage including ported juxtaposed gate and segment members having parallel outer sealing surfaces and ports for alignment with said flow passages when the valve is open; and means for moving said gate and segment members into sealing engagement with said valve seats in the open and closed positions of the valve, the improvement comprising:

pressure relief means installed in said segment member for relieving excessive fluid pressure from the valve chamber into the inlet flow passage at a predetermined temperature, said pressure relief means including a passage extending from the port through the segment to the sealing face of the segment at a location which is exposed to said inlet flow passage when the gate assemblage is in the valve closed position;

an internal annular shoulder formed in the wall of said passage intermediate the ends thereof and providing a valve seating surface within the passage, said passage having a first counterbore section extending from the sealing face of the segment to said valve seating surface and a second section extending from the port in the segment to said first section;

a valve element normally disposed in seated engagement with said valve seating surface and blocking said passage;

a perforated retainer element installed in the first counterbore section of said passage in spaced relation to said valve element; and a plug of eutectic material filling the remainder of the first counterbore section between said retainer element and said valve element and holding the valve element in seated engagement against said valve seating surface, said plug being adapted to melt at a preselected temperature whereby upon the temperature of the valve chamber reaching said preselected temperature a greater fluid pressure in the valve chamber will force the eutectic material from said passage through the perforated retainer element into the upstream flow passage to relieve said valve chamber, said valve element being pressure energizable in response to a subsequent leak from the valve chamber or the downstream seal to block said passage and allow the valve to provide an upstream seal.

2. In a gate valve as set forth in claim 1 wherein said valve element is a hard metal ball.

3. In a gate as set forth in claim 1 wherein said valve seating surface is a frusto-conical surface.

4. In a gate valve having a valve body with inlet and outlet flow passages defining a flow way through said valve, a bonnet mounted on the valve body and defining therewith a valve chamber communicating with said flow passages, opposed aligned valve seats in said valve body surrounding the inlet and outlet flow passages and exposed to said valve chamber, an expansible ported gate assembly movably mounted in the valve chamber for rectilinear movement across said flow way between a first position wherein the valve is open and a second position wherein the valve is closed, said assembly including a pair of ported juxtaposed gate assembly members having parallel outer sealing surfaces and ports for alignment with said flow passages when the valve is open; and means for moving said pair of gate assembly members into sealing engagement with said valve seats in the open and closed positions of the valve, the improvement comprising:

pressure relief means installed in the upstream member of said gate assembly members for relieving excessive fluid pressure from the valve chamber into the inlet flow passage at a predetermined temperature, said pressure relief means including a passage extending from the port through said upstream gate assembly member to the sealing face of the upstream member at a location which is exposed to said inlet flow passage when the gate assembly is in the valve closed position;

an internal annular shoulder formed in the wall of said passage intermediate the ends thereof and providing a valve seating surface within the passage, said passage having a first counterbore section extending from the sealing face of the upstream gate assembly member to said valve seating surface and a second section extending from the port in said upstream member to said first section;

a ball valve element normally disposed in seated engagement with said valve seating surface and blocking said passage, an apertured retainer element installed in the first counterbore section of said passage in spaced relation to said ball valve element, and a plug of eutectic material filling the remainder of the first counterbore section between said retainer element and said valve element and holding the valve element in seated engagement against said valve seating surface, said plug being adapted to melt at a preselected temperature whereby upon the temperature of the valve chamber reaching said preselected temperature a greater fluid pressure in the valve chamber will force the eutectic material from said passage through the perforated retainer element into the upstream flow passage to relieve said valve chamber, said valve element being pressure energizable in response to a subsequent leak from the valve chamber or the downstream seal to block said passage and allow the valve to provide an upstream seal.

5. In a gate valve as set forth in claim 4 wherein said valve seating surface is a frusto-conical surface.

6. In a gate valve as set forth in claim 4 wherein said eutectic material is an alloy of tin.

* * * * *

UNITED STATES PATENT AND TRADEMARK OFFICE
CERTIFICATE OF CORRECTION

PATENT NO. : 4,515,174

DATED : May 7, 1985

INVENTOR(S) : F. Harold Hollister & Danny S. Meyer

It is certified that error appears in the above-identified patent and that said Letters Patent is hereby corrected as shown below:

Column 4, line 4, change "in" to -- is --.

Column 6, line 42, after "gate" insert -- valve --.

In the "ABSTRACT", line 29, change "to" to -- or --.

Signed and Sealed this

Eighth Day of October 1985

[SEAL]

Attest:

DONALD J. QUIGG

Attesting Officer

Commissioner of Patents and
Trademarks—Designate